INVENTOR.
GILBERT P. HYATT

BY Lindenberg + Freilich

ATTORNEYS

INVENTOR.
GILBERT P. HYATT
BY Lindenberg + Freilich
ATTORNEYS

Feb. 16, 1971 G. P. HYATT 3,564,536

SYNCHRO/DIGITAL CONVERTER

Filed Nov. 13, 1967 3 Sheets-Sheet 3

INVENTOR.
GILBERT P. HYATT

BY Lindenberg + Freilich

ATTORNEYS

United States Patent Office 3,564,536

Patented Feb. 16, 1971

3,564,536

SYNCHRO/DIGITAL CONVERTER

Gilbert P. Hyatt, Los Angeles, Calif., assignor to Teledyne Incorporated, Los Angeles, Calif., a corporation of Delaware Filed Nov. 13, 1967, Ser. No. 682,043
Int. Cl. H03k *13/02*
U.S. Cl. 340—347 11 Claims

ABSTRACT OF THE DISCLOSURE

A synchro to digital converter capable of generating angle, sine, and cosine information in digital whole number and incremental form. Synchro signals applied to the converter are first transformed to AC analog form and thereafter to DC analog form. A digital computation means, such as a differential analyzer or stored program computer, subsequently operates on the signals to yield the desired information. The computation means implements a trigonometric identity and provides an error signal which is used to vary the output until the error is reduced to zero. The computation means automatically compensates for any scale factor errors introduced in the analog portion of the converter prior to the computation means.

BACKGROUND OF THE INVENTION

(1) Field of the invention

This invention relates generally to apparatus for converting synchro signals to digital form.

The application of digital computers has been severely limited in systems that must interface with analog computer equipment. This limitation is particularly significant in aerospace systems where the lack of the appropriate interface equipment often precludes the use of a digital computer. Although highly miniaturized and economical digital computers are readily available, the required interface equipment often exceeds the size and cost of the computer and thus can offset any advantages provided thereby. In order to enhance the applicability of digital computers for aerospace applications, considerable effort has been expended in the development of hybrid interface equipment. The basic guidelines for the development of such interface equipment call for: (1) Placing the burden of conversion from analog to digital form on the digital equipment; (2) minimizing the performance requirement placed on the analog equipment; and (3) eliminating electromagnetic and electromechanical equipment.

Normally, the most complex part of such hybrid interface equipment constitutes the means for converting information presented in conventional synchro signal format (i.e., AC analog form) to a digital format (both whole number or incremental).

(2) Description of the prior art

Various converters are disclosed in the prior art which are capable of converting synchro signals to digital signals. However, all such known converters operate on principles which are essentially inconsistent with the aforementioned basic guidelines. That is, known synchro to digital (S/D) converters usually perform the conversion either with electromechanical followup servos driving digital shaft encoders or by switching taps on transformer type electromagnetic equipment. These techniques generally require large, heavy, and expenesive hardware in the servo loop to null the input signal. The size, weight, performance, and cost considerations preclude the use of these prior art converters for many aerospace applications.

A typical prior art synchro to digital (S/D) converter is disclosed in U.S. Pat. No. 3,335,417. This patent reviews early S/D converters which generally employed servo driven shaft encoders to translate synchro signals to digital form. The patent goes on to point out that shaft encoders are extremely slow and, therefore, unsuitable for many digital applications. Thus, the patent introduces a S/D converter which avoids the use of shaft encoders but which relies on voltage divider resistor networks for trigonometric function generation and multiplication. The use of such networks for these purposes places the primary burden of conversion on analog equipment and thus is inconsistent with the basic guidelines previously set forth herein.

In view of the foregoing, it is an object of the present invention to provide a S/D converter comprised of analog and digital hardware and in which a minimum amount of signal processing is performed by the analog hardware.

It is a further object of this invention to provide a S/D converter containing digital hardware which assures scale factor and phase angle precision by automatically compensating for errors introduced by the analog hardware.

SUMMARY OF THE INVENTION

Briefly, in accordance with the present invention, a S/D converter is provided which accepts AC analog form signals from a synchro and converts them, after minimum processing, to DC analog form. The DC analog signals are subsequently applied to a digital servo loop which is implemented by a digital computation device such as a digital differential analyzer or general purpose digital computer. The digital computation device implements a trigonometric expression which is nulled by the servo loop action to thus yield digital output signals representative of the DC analog signals.

A significant feature of the present invention is that conversion from analog to digital form is performed entirely in the digital domain.

Another significant feature of the invention is that the conversion performed by the digital computation device compensates for any scale factor errors introduced by prior analog processing.

Another significant feature of the invention involves the ability of the digital computation appratus to provide sine and cosine information as well as angle information, in both whole number and incremental form.

The novel features of the invention are set forth with particularity in the appended claims. The invention will best be understood from the following description when read in conjunction with the accompanying drawings.

BRIEF DESCRIPTION OF THE DRAWINGS

Attention is now called to FIG. 1, which schematically illustrates a conventional synchro apparatus. A synchro is an analog angular position transducer which provides AC voltage signals, whose amplitudes are indicative of the angular position of the synchro rotor. Both two and three signal synchros are well known in the art. FIG. 1 illustrates a three signal synchro which is comprised of a rotor 10 excited by an AC voltage source 12. The rotor is inductively coupled to the Y windings of a stator 14. The angular position $\theta$ of the rotor, with respect to the stator, will determine the elecromagnetic coupling between the rotor winding and each of the stator windings to thereby define the ampliutdes of the signals induced in the stator windings. The output voltages yielded by the stator windings are either in phase or 180° out of phase with the reference excitation. The amplitude and phase (i.e., either in-phase or out-of-phase) of the output voltages are indicative of the angular displacement $\theta$ of the rotor. The output voltages are in time phase with the excitation signal provided by the source 12 with the amplitude of the output signals conveying the angular information. Phase shifts between the excitation voltage and the output signals do not convey angular information but are potential sources of error in interpreting the output signals.

Figure 1:
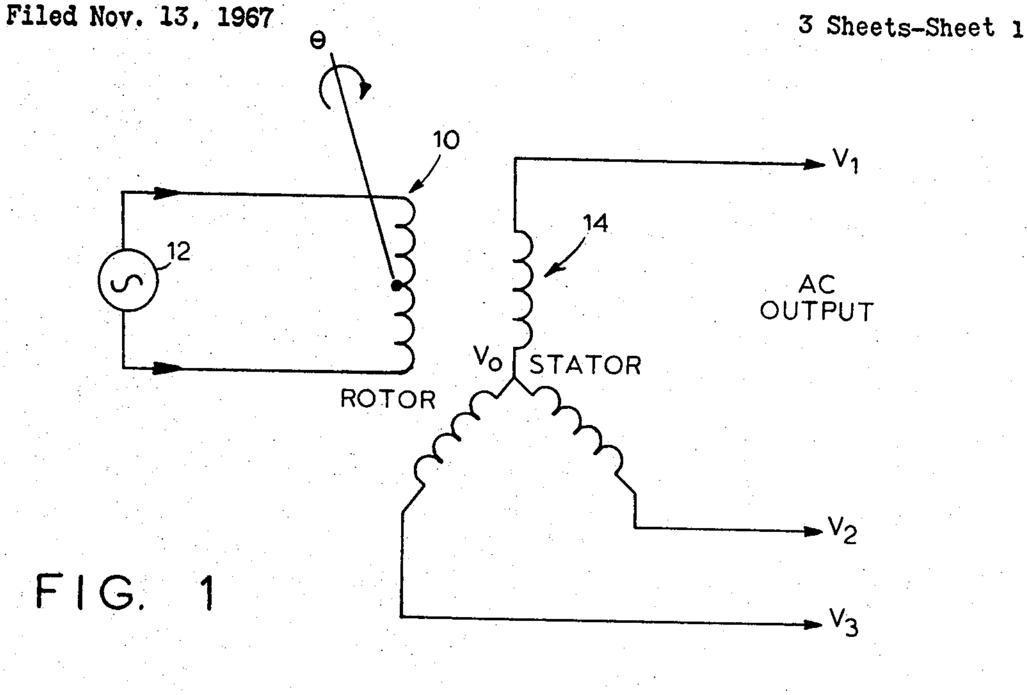
FIG. 1 is a schematic diagram of a conventional three signal synchro.

More particularly, the excitation signal, represented by Equation 1, is electromagnetically coupled to the stator windings to generate the output signals represented in Equations 2–4:

$$V_{excitation}=E \sin wt \qquad \text{Eq. 1}$$

$$V_{0-1}=K_1E \sin wt \sin \theta \qquad \text{Eq. 2}$$

$$V_{0-2}=K_1E \sin wt \sin (\theta-120°) \qquad \text{Eq. 3}$$

$$V_{0-3}=K_1E \sin wt \sin (\theta-240°) \qquad \text{Eq. 4}$$

The time dependent term sine $wt$ is common to all signals and is not a function of rotor position. The other terms of the synchro output equations are amplitude defining qualities, independent of the time varying portion of the waveform. It can be seen that the output signals are all in time phase with the excitation signal and the amplitude is a trigonometric function of the angular position $\theta$ of the rotor. Equations 2–4 define the voltage induced in the windings from the common point of the three winding Y connection to each of the stator output terminals. The common point of the three windings is not usually available for synchro followup operation however. Therefore, it is normally necessary to operate on the voltages across the three output windings. These output voltages are expressed by Equations 5, 6, and 7, with the subscript defining the terminals across which the voltages are derived.

$$V_{1-2}=K_2E \sin wt \sin (\theta-150°) \qquad \text{Eq. 5}$$

$$V_{2-3}=K_2E \sin wt \sin (\theta+90°) \qquad \text{Eq. 6}$$

$$V_{3-1}=K_2E \sin wt \sin (\theta-30°) \qquad \text{Eq. 7}$$

Equations 5 and 7 contain sufficient information to completely define the synchro rotor position, while Equation 6 is redundant. The information contained in Equations 5 and 7 can be organized in a more intuitive form with the use of the trigonometric identities illustrated by Equations 8 and 9.

$$\sin (\theta-150°) = \sin \theta \cos 150° - \cos \theta \sin 150° \qquad \text{Eq. 8a}$$

$$= -\sqrt{\ } \sin \theta - ½ \cos \theta \qquad \text{Eq. 8b}$$

$$\sin (\theta-30°) = \sin \theta \cos 30° - \cos \theta \sin 30° \qquad \text{Eq. 9a}$$

$$= \sqrt{3}/2 \sin \theta - ½ \cos \theta \qquad \text{Eq. 9b}$$

Substituting Equations 8*b* and 9*b* into Equations 5 and 7 yields Equations 10 and 11, respectively.

$$V_{2-1}=\frac{K_2E}{2} \sin \text{wt} (\sqrt{3} \sin \theta+\cos \theta) \qquad \text{Eq. 10}$$

$$V_{3-1}=\frac{K_2E}{2} \sin \text{wt} (\sqrt{3} \sin \theta-\cos \theta) \qquad \text{Eq. 11}$$

From Equations 10 and 11 it can be seen that the voltages respectively measured from synchro output terminals 2 and 3 to synchro ouput terminal 1, is composed of sine and cosine components of the angular displacement of the synchro rotor. The coefficients of the corresponding trigonometric functions of $\theta$ from Equations 10 and 11 are equal. Therefore, algebraic manipulation of Equations 10 and 11 can be used to isolate the components of the output signals that define the sine and cosine of the synchro angular position. The addition and subtraction of Equations 10 and 11 will yield Equations 12 and 13, respectively.

$$V_{2-1}+V_{3-1}=K_2\sqrt{3} E \sin wt \sin \theta \qquad \text{Eq. 12}$$

$$V_{2-1}-V_{3-1}=K_2E \sin wt \cos \theta \qquad \text{Eq. 13}$$

Equations 12 and 13 completely define the angular position of the synchro rotor. It shoud lbe noted that the trigonometric function of $\theta$ contribute only to the amplitude of the respective signals, introducing no inherent time or phase shift. The two signals defined in Equations 12 and 13 are time coincident with the excitation voltage provided by source 12, excluding any error mechanisms.

Figure 2:
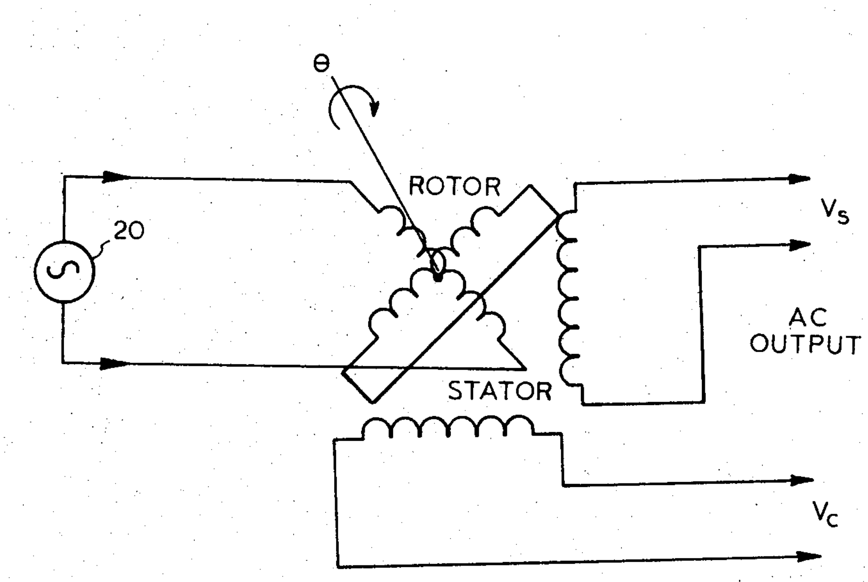
FIG. 2 is a schematic diagram of a conventional two signal synchro called a resolver.

Attention is now called to FIG. 2, which schematically illustrates a two signal synchro, commonly known as a resolver. The resolver will transform the excitation voltage provided by source 20 into sine and cosine components of the angular displacement $\theta$ of the resolver rotor. With an excitation voltage defined by Equation 14 applied to the rotor as illustrated in FIG. 2, the output signals from the resolver will be as defined by Equations 15 and 16.

$$V_{excitation}=E \sin wt \qquad \text{Eq. 14}$$

$$V_s=E \sin wt \sin \theta \qquad \text{Eq. 15}$$

$$V_c=E \sin wt \cos \theta \qquad \text{Eq. 16}$$

It will be noted that Equations 15 and 16 are similar to form to Equations 12 and 13, yielding a common signal form upon which to develop compatible synchro-resolver/to digtal converters.

It is germane to point out at this point that a device known as a Scott transformer exists which is capable of converting between the two signal AC format provided by the resolver of FIG. 2 and the three signal AC format provided by the synchro of FIG. 1. In order to convert signals to a digtal format in accordance with one form of the present invention, it is necessary to initially convert the three signals provided by the synchro of FIG. 1 to the two signal format as would be provided by a resolver or Scott transformer. Although a transformer can be used to convert the output of a three signal synchro, such a device is normally relatively bulky, heavy, and expensive. As will be seen hereinafter, in accordance with a preferred embodiment of the invention, electronic circuits which can employ semiconductor and resistor components are utilized to perform the three signal to two signal format conversion in lieu of utilizing a Scott transformer. Briefly, conversion from a three signal format to a two signal format in accordance with the preferred embodiment of the invention is accomplished by adding and subtracting the quantities represented by Equations 10 and 11 to yield Equations 12 and 13.

Figure 3:
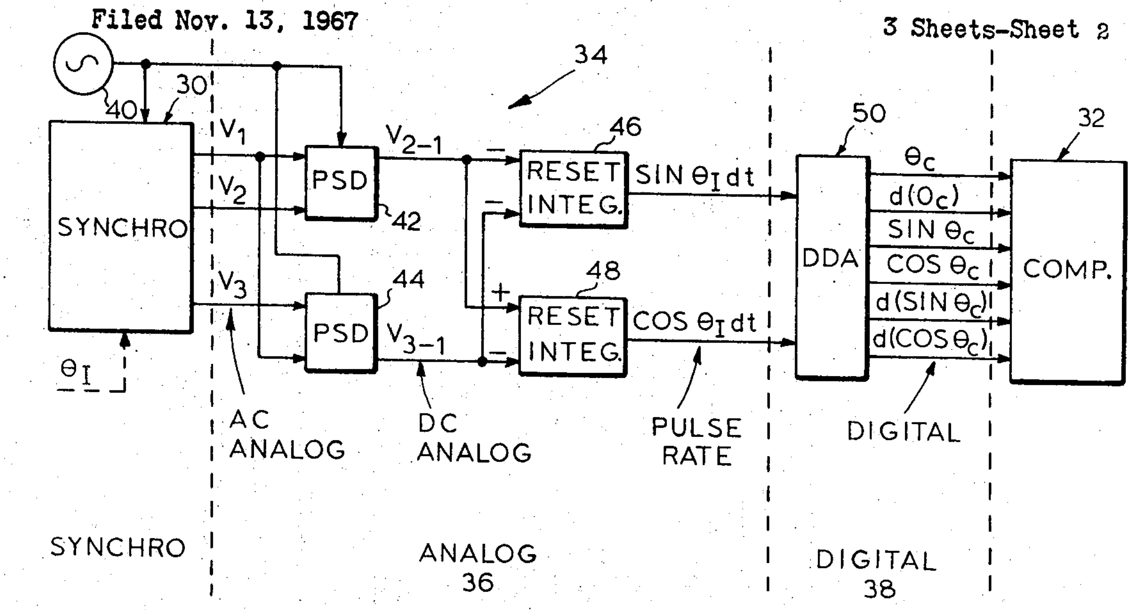
FIG. 3 is a block diagram of a preferred embodiment of the invention.

Attention is now called to FIG. 3, which illustrates a block diagram of a preferred embodiment of the invention for converting AC signals provided by a three signal type synchro apparatus 30 to digital form suitable for application to some external digital device, such as a computer 32. The converter 34 is essentially comprised of an analog hardware portion 36 and a digital hardware portion 38. Thus, the synchro 30 interfaces with the analog portion 36, which in turn interfaces with the digital portion 38, which in turn interfaces with the external computer 32.

As hereinbefore illustrated, the synchro 30 will be excited from a reference AC voltage supply 40. The excitation voltage is coupled to the synchro output windings as a function of the mechanical angular displacement of the synchro rotor which is illustrated as the $\theta_I$ input angular displacement in FIG. 3. The three synchro output lines present signals $V_1$, $V_2$ and $V_3$ to the synchro analog interface which signals are indicative of the angular position of the synchro rotor. The signals $V_1$, $V_2$ and $V_3$ are in AC analog form with an AC carrier frequency that is amplitude modulated as a trigonometric function of the angular displacement of the synchro rotor. The signals $V_1$, $V_2$ and $V_3$ represented in FIG. 3 correspond to the signals represented by previously set forth Equations 5, 6 and 7.

The signals $V_1$ and $V_2$ are applied to a first phase sensitive demodulator 42. The signals $V_1$ and $V_3$ are applied to a second phase sensitive demodulator 44. The phase sensitive demodulators 42 and 44 each function as an AC analog to DC analog converter. The demodulators respectively operate on the input signals applied thereto to develop the voltages represented by Equations 10 and 11 without the time varying term, sine *wt*. Each phase sensitive demodulator of FIG. 3 can be implemented with a synchronous chopper which switches the input signals applied thereto onto an output line in synchronism with the AC excitation signal. The output of each phase sensitive demodulator constitutes a DC signal with a high ripple content, similar to a full wave or half wave rectified wave form.

The DC analog output signals $V_{2-1}$ and $V_{3-1}$ respectively provided by the demodulators 42 and 44 are cross summed nad applied to first and second reset integrators 46 and 48. The reset integrators function to convert applied DC analog signals to proportional pulse rate signals. The reset integrators inherently provide a filtering function which makes it unnecessary to utilize passive filters coupled to the outputs of the demodulators 42 and 44. Additionally, the reset integrators function to perform algebraic summation of the signals provided thereto by the demodulators 42 and 44 to thus effectively convert the three signal type information to two signal type information. More particularly, the signals $V_{2-1}$ and $V_{3-1}$ are applied to the integrator 46 in a manner to be cross summed so that the integrator 46 yields an output signal whose pulse rate is proportional to the sine of the input angle $\theta_I$ as represented by the aforementioned equation 12. Simlarly, the reset integrator 48 is responsive to the difference between the signals $V_{2-1}$ and $V_{3-1}$ and therefore provides an output signal whose pulse rate is proportional to the cosine of the angle $\theta_I$.

Briefly, the reset integrator can comprise an analog integrator which integrates the DC voltages applied to the input thereof. When the integrator output exceeds a voltage threshold, a precise reset pulse is generated to reset the integrator by calibrated amounts by discharging a feedback capacitor. The rate at which the reset integrator continues to exceed the threshold is a function of the input voltage level. The resetting pulse rate is also used as the reset integrator output signal and is indicative of the rate at which the reset integrator continues to exceed the voltage threshold. Therefore, the reset integrator output pulse rate is directly proportional to the average input voltage magnitude. Accordingly, it will be appreciated that the reset integrator functional block of FIG. 3 is used to perform essentially three functions; i.e., DC voltage to pulse rate conversion, three signal type format to two signal type format conversion and filtering.

Although the phase sensitive demodulators 42 and 44 and reset integrators 46 and 48 can be implemented in several different manners, it is pointed out that a suitable reset integrator is available from Teledyne Systems, Hawthorne, Calif. (Assembly No. 8007933). Suitable phase sensitive demodulators are described in section 4.4 of Automatic Control Systems by B. C. Kuo, published by Prentice-Hall, Inc.

The output signals provided by the reset integrators 46 and 48 are applied across the interface from the analog portion 36 to the digital portion 38 of the converter. The output signals provided by the reset integrators 46 and 48 comprise pulse trains respectively having rates proportional to the sine and cosine of the synchro rotor angular displacement. These two pulse trains are significantly amplitude sensitive and will be readily affected by variations in the excitation voltage, transformation ratios, and other mechanisms that affect the scale factor of the signals. Accordingly, the pulse trains provided by the reset integrators 46 and 48 cannot be directly converted to digital angle form inasmuch as the scale factor errors therein will appear as angular displacement errors. Accordingly, the digital portion 38 of the converter operates to eliminate scale factor errors by essentially utilizing the ratio of the two pulse trains instead of each pulse train by itself to determine the angular displacement $\theta$.

The digital portion 38 of the converter in the preferred embodiment of the invention is comprised of a digital differential analyzer 50 (DDA) which implements a digital servo loop to eliminate the scale factor sensitivity of the synchro signals. More particularly, the digital differential analyzer implements the following well known trigonometric identity $$\sin(\theta_I - \theta_C) = \sin\theta_I \cos\theta_C - \cos\theta_I \sin\theta_C \qquad \text{Eq. 17}$$

where $\theta_C$ represents the computed angle and sine $(\theta_I - \theta_C)$ represents the digital servo loop error. As will be seen hereinafter, the error operates to vary the computed angle $\theta_C$ until the error is reduced to zero. When this occurs, the angle $\theta_C$ will equal the input angle $\theta_I$ independent of any scale factor errors introduced in the analog portion of the equipment.

Figure 4:
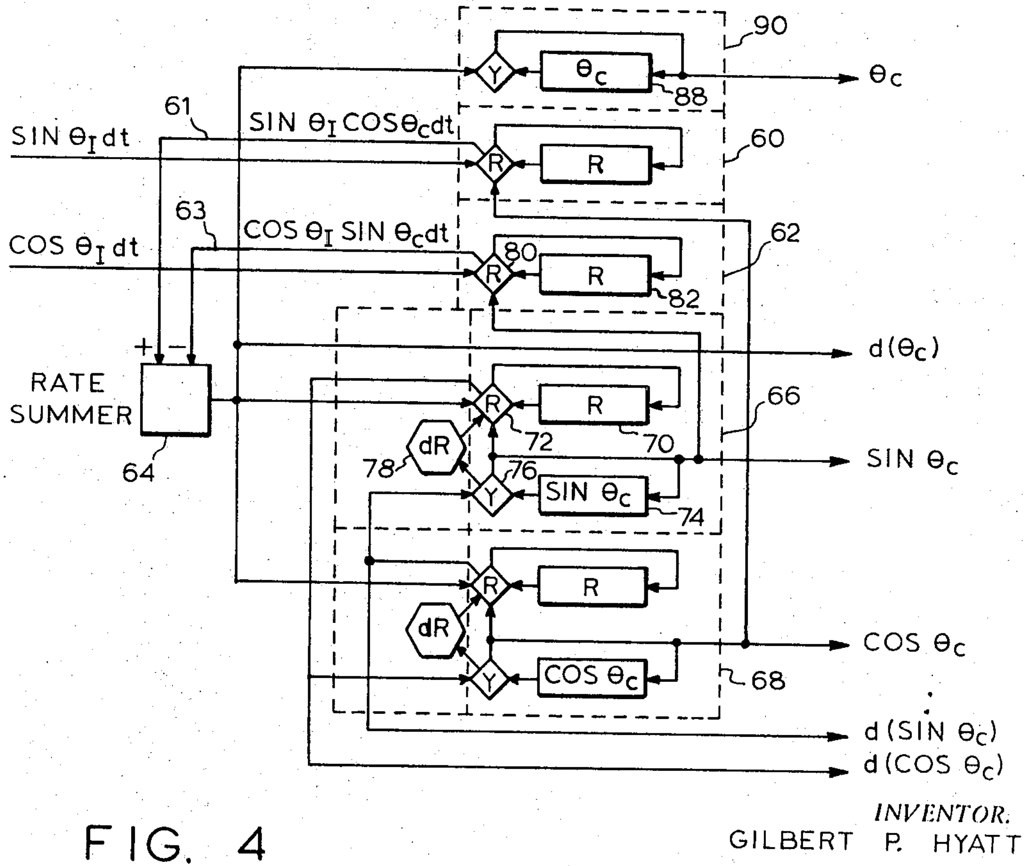
FIG. 4 is a block diagram of the digital differential analyzer employed in FIG. 3.

Before proceeding to a detailed description of the DDA implementation as shown in FIG. 4, some general comments of the overall functioning of the DDA will be discussed. The DDA 50 includes a sine-cosine generator which is used as a digital resolver and which is computationally rotated to null the trigonometric identity expressed by Equation 17. The use of digital techniques to solve Equation 17 assures the availability of trigonometric functions that are completely independent of any scale factor type errors occuring in the analog portion of the converter. The outputs of the DDA 50 express trigonometric (sine and cosine) functions of the input angle in whole number or incremental digital form as well as expressing the angle itself in whole number or incremental form. The computation performed by the DDA 50 eliminates scale factor sensitivity of the converter and thus significantly decreases the accuracy required of the analog portion 36. As a consequence, the cost of the analog equipment 36 is correspondingly reduced.

Attention is now called to FIG. 4, which illustrates the details of a digital differential analyzer which implements Equation 17 and which is capable of providing the desired trigonometric and angular information with respect to a computed angle $\theta_C$, in digital whole number and incremental form, in response to the pulse rate signals provided thereto by the reset integrators 46 and 48 on conductors 52 and 54, respectively. The pulse rate signal provided by reset integrator 46 on conductor 52 is applied to a multiplier stage 56 of FIG. 4, which stage yields a pulse rate output signal on line 58 proportional to the component ($\sin\theta_I \cos\theta_C$). The multiplier stage 56 is comprised of a shift register or accumulator 60 and a whole number arithmetic unit 62. As each pulse arrives on conductor 52, the unit 62 adds (or subtracts) the whole number $\cos\theta_C$ information on line 63 to the contents of register 60. The unit 62 transfers any overflow via line 58 to the rate summer and the residual is stored in the register 60.

The pulse rate output signal provided by reset integrator 48 on conductor 54 is applied to multiplier stage 64, which is substantially identical to stage 56. Stage 64 provides a pulse rate signal proportional to the component ($\cos\theta_I \sin\theta_C$) on line 65. The output lines 58 and 65 are both coupled to a rate summer 66, which develops a plus rate output signal substantially proportional to the difference between the input signals applied thereto.

The output signal provided by the rate summer 66 is utilized as a servo loop error and is connected to DDA integrator stages 67 and 68 of the DDA. The DDA integrator stages 67 and 68 are interconnected as a sine-cosine function generator. Such a generator is described on page 260 of "Digital Computer and Control Engineering" by Robert S. Leadly, published by the McGraw-Hill Book Co., Inc., 1960.

The DDA integrator 67 is primarily comprised of an accumulator 70, a whole number arithmetic unit 72, and a counter 74. The accumulator 70 and counter 74 constitute digital shift register. Block 76 comprises an incremental arithmetic unit and block 78 comprises a trapezoidal correction means. The contents of the accumulator 70 is referred to as the residual and is denoted by the letter R. The contents of the counter 74 constitute the functional value and, in the case of integrator 67, stores the function sin $\theta_C$.

The integrator 68 is identical to the integrator 67, but the counter thereof is utilized to store the function cos $\theta_C$. The output of the whole number arithmetic unit 72 of the integrator 67 is connected to the input of the incremental arithmetic unit 76 of the integrator 68 and the output of the whole number arithmetic unit of the integrator 68 is in turn connected to the incremental arithmetic unit 76 of the integrator 67. The whole number arithmetic units of the integrators 67 and 68 are driven by the error signal provided by the rate summer 66. As each error pulse is applied to an aritmetic unit 72, the unit adds (or substracts) the contents of the counter 74 connected thereto to the residual stored in the associated accumulator 70. Any resulting overflow appears on the unit's output terminal 73 which as noted is coupled to the incremental arithmetic unit 76 of the other integrator. The residual from each unit 72 is recirculated in the accumulator coupled thereto. Each pulse applied to an incremental arithmetic unit 76 increments the whole number contained in the corresponding counter 74. Thus, the counter will store the instantaneous value of a function (e.g., sin $\theta_C$) while the accumulator and whole number arithmetic unit will develop the integral function. By interconnecting the integrator 67 and 68, as shown in FIG. 4, they will generate sine-cosine functions as discussed in greater detail in the previously mentioned book, by Leadley. Therefore, integrator 67 will provide a whole number digital signal proportion to the sine of the computed angle $\theta_C$. Similarly, the integrator 68 will provide a whole number digital signal proportional to the cosine of the angle $\theta_C$. The overflow from the arithmetic units 72 of the integrator 67 and 68 will respectively represent the sine and cosine of the angle $\theta_C$ in incremental form.

It should thus be appreciated that the DDA of FIG. 4 will operate to implement Equation 17 which is the well known trigonometric identity for the sine of the difference of two angles. The input angle $\theta_I$, will, of course, be defined by the synchro rotor displacement with respect to the stator. The computed angle, $\theta_C$ is contained in the sine-cosine generator comprised of integrators 67 and 68. For the condition that $\theta_I$ is equal to $\theta_C$ Equation 17 will be nulled. The implementation of Equation 17 with a DDA and an implicit servo loop will cause the DDA sine-cosine generator (digital resolver) to be driven to a condition equivalent to the angular displacement of the synchro. As the synchro rotor is rotated, the DDA sine-cosine generator will be servoed to the corresponding angular position. Therefore, the DDA will effectively perform the function of a followup servo.

It should be appreciated that scale factor coefficients of the trigonometric functions will not affect the computation at the digital servo summing junction, i.e., the rate summer 66. A true scale factor coefficient will be common to each of the trigonometric components (i.e., sin $\theta_I$ cos $\theta_C$) of Equation 17, thereby affecting the gain of the digital servo loop but not the null point. The DDA computation that implements Equation 17 will be nulled independent of the scale factor of the respective angular functions.

The output scale factor of the digital servo is dependent only on the initial conditions loaded into the sine-cosine generator, i.e., the counters of the integrators 67 and 68. The vector sum of initial conditions for the sine-cosine generator will define the scale factor of the output trigonometric functions. These initial conditions will be simple to generate, permitting a zero to be loaded into the counter 74 of integrator 67 and a nominal scale factor, to be loaded into the counter 74 of integrator 68. These initial conditions are representative of an initial zero degree angular position of the synchro rotor with a nominal scale factor. After the initial conditions are loaded, the digital servo loop will be closed, thereby permitting the digital resolver (i.e., the sine-cosine generator) to be driven to the angular position corresponding to the synchro rotor. Therefore, only constant initial conditions need be loaded as the digital resolver will automatically generate the proper parameters after the digital servo loops has been closed.

It has previously been pointed out that the integrators 67 and 68 will respectively provide whole number trigonometric digital information representing sin $\theta_C$ and cos $\theta_C$, respectively, and that the arithmetic unit 72 of the integrators 67 and 68 will respectively provide incremental information respectively representing changes in sin $\theta_C$ and cos $\theta_C$ [i.e., $d(\sin\theta_C)$ and $d(\cos\theta_C)$]. Incremental angular information $d(\theta_C)$ is provided directly by the output of the rate summer 66. This incremental angular information can be accumulated by register 88 of stage 90 to provide digital whole number angular information $\theta_C$.

Figure 5:
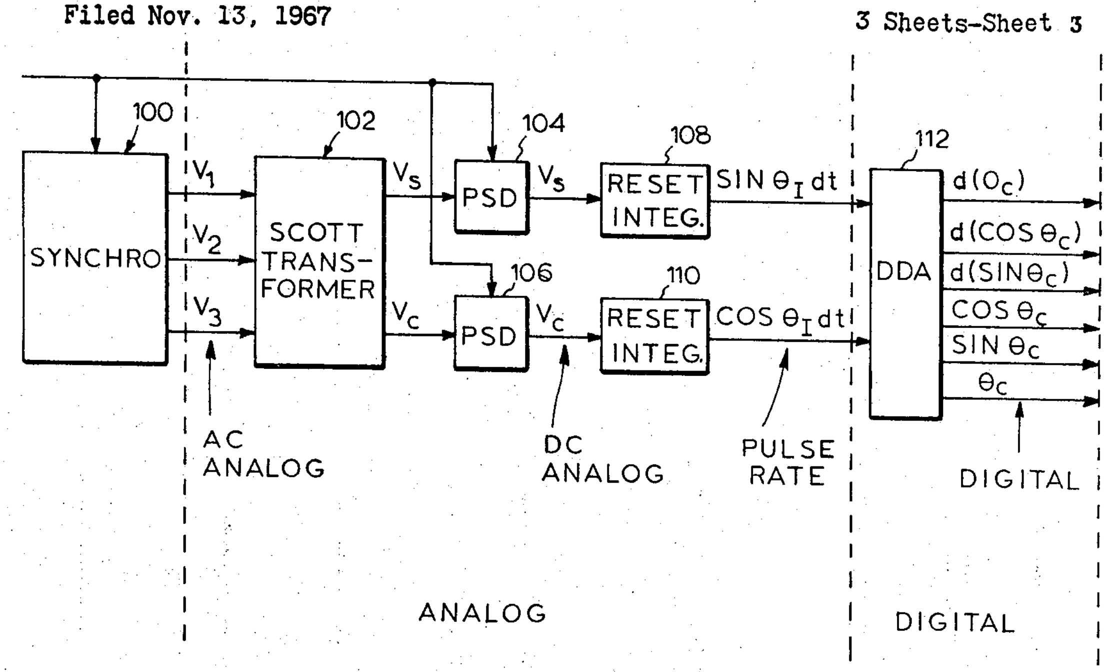
FIG. 5 is a block diagram of an alternate embodiment of the invention.

Attention is now called to FIG. 5, illustrating an alternate converter embodiment in accordance with the invention. The embodiment of FIG. 5 differs from the embodiment of FIG. 3 in that two signal resolver type information is developed prior to and independently of the phase sensitive demodulators shown in FIG. 3. FIG. 5 illustrates the output of synchro 100 being coupled through a Scott transformer 102 to yield the two signal format information previously discussed. However, the embodiment of FIG. 5 is equally as applicable where a two signal synchro of the resolver type as shown in FIG. 2 is substituted for the three signal synchro and Scott transformer of FIG. 5. The phase sensitive demodulators 104 and 106 of FIG. 5 perform essentially the same function as they performed in the embodiment of FIG. 3, i.e., to convert the signals applied thereto from an AC analog form to a DC analog form. The outputs of the demodulators 104 and 106 are respectively applied to reset integrators 108 and 110 in the embodiment of FIG. 5. It will be recalled from the description of FIG. 3 that the reset integrators 46 and 48 therein converted the three signal synchro signals to two signal format signals by a cross summing procedure. Inasmuch as the two phase resolver type signals are provided by the Scott transformer 102 in the embodiment of FIG. 5, no cross summing is required therein and the two channels operate virtually independently. The reset integrators 108 and 110 in FIG. 5 do, however, perform the two other significant functions of filtering and converting the signals applied thereto from DC analog to pulse rate form. The pulse rate output signals provided by the reset integrators 108 and 110 of FIG. 5 are applied to a DDA 112 which can be identical to the DDA illustrated in FIG. 4.

Figure 6:
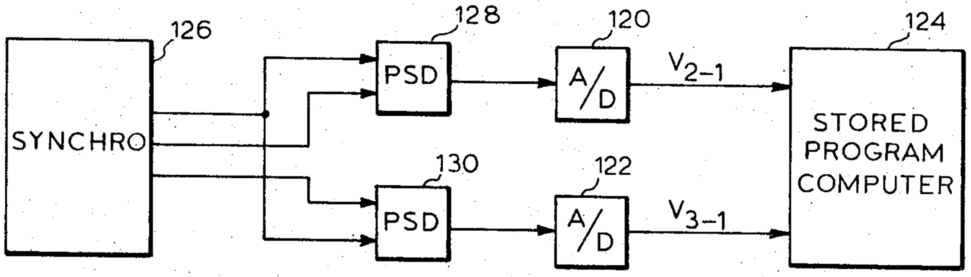
FIG. 6 is a block diagram of a still further embodiment of the invention.

Attention is now called to FIG. 6, which illustrates a still further embodiment of the invention in which analog to digital converters 120 and 122 can be utilized in lieu of the reset integrators of FIGS. 3 and 5. As an example, each of the analog to digital converters of FIG. 6 can comprise a Teledyne Telemetry Company Model No. 610. The outputs of the analog to digital converters 120 and 122 of FIG. 6 are applied to a stored program digital computer 124, in lieu of a digital differential analyzer as was the case with FIGS. 3 and 5.

More particularly, in the embodiment of FIG. 6, the three signal output format derived from a synchro 126 are applied to a pair of phase sensitive demodulators 128 and 130. As in the embodiments of FIGS. 3 and 5, the phase sensitive demodulators convert the signals applied thereto from AC analog to DC analog form. The converters 120 and 122 convert the DC analog signals to digital signals which are trigonometric functions of the input angle and which may contain scale factor errors. The signals from converters 120 and 122 are applied to computer 124, which, as pointed out, is used in lieu of the DDA of FIGS. 3 and 5, to eliminate scale factors and to develop digital signals representative of the angle. The computer 124 preferably implements the following equations in order to derive the angle parameter and to eliminate scale factor errors arising in the analog domain:

$$\theta = \text{arc tan}\,\frac{(V_{2-1}+V_{3-1})}{\sqrt{3}\,(V_{2-1}-V_{3-1})} \qquad \text{(Eq. 18)}$$

From the foregoing, it should be appreciated that synchro to digital converter embodiments have been shown herein which place the burden of the conversion on the more accurate digital equipment in contrast to most known prior art converters which utilize analog hardware to perform essentially the entire conversion. Thus, embodiments of the present invention are able to yield more accurate results and, as a consequence of minimizing the performance requirement placed on the analog equipment, the converter can be provided at a lower cost.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. A synchro to digital converter for converting first and second AC analog signals which are functions of the sine and cosine of an angle $\theta_I$ to digital form, said converter comprising:

means responsive to said first and second AC analog signals for developing first and second DC analog signals related thereto;

means responsive to said first and second DC analog signals for developing first and second pulse trains having rates respectively proportional to the sine and cosine of said angle $\theta_I$; and digital computation means responsive to said first and second pulse trains for developing digital output signals representative of said angle $\theta_I$.

2. The converter of claim 1 wherein said digital computation means comprises a digital differential analyzer including:

generator means for generating first and second digital signals respectively representing the sine and cosine functions of angle $\theta_C$;

multiplication means responsive to said first pulse train and said second digital signal for developing a first product signal related to the quantity sin $\theta_I$ cos $\theta_C$ and responsive to said second pulse train and said first digital signal for developing a second product signal related to the quantity cos $\theta_I$ sin $\theta_C$;

means responsive to said first and second product signals for developing an error signal; and means responsive to said error signal for varying said angle $\theta_C$.

3. The converter of claim 2 wherein said digital differential analyzer includes means for providing first and second incremental digital output signals respectively representing the changes in the quantities in sine $\theta_C$ and cos $\theta_C$.

4. The converter of claim 2 wherein said digital differential analyzer includes means for providing first and second whole number digital output signals respectively representing the quantities sin $\theta_C$ andc os $\theta_C$.

5. The converter of claim 2 wherein said digital differential analyzer includes means for providing an incremental digital output signal representing the changes in the angle $\theta_C$.

6. The converter of claim 2 wherein said digital differential analyzer includes means for providing an incremental signal representing the change in the angle $\theta_C$; and accumulator means responsive to said incremental signal representing the change in the angle $\theta_C$ for providing a whole number digital output signal representing the angle $\theta_C$.

7. The converter of claim 1 wherein said means responsive to said DC analog signals includes a reset integrator.

8. The converter of claim 1 wherein said means responsive to said AC analog signals includes a phase sensitive demodulator.

9. Apparatus responsive to the application of first and second analog signals which are proportional to the functions of the sine and cosine of an angle $\theta_I$ for providing digital output signals related to said angle $\theta_I$, said apparatus including:

first digital means for defining an angle $\theta_C$;

second digital means responsive to said defined angle $\theta_C$ and said analog signals applied to said apparatus for developing first and second digital signals respectively representing the quantities sin $\theta_I$ cos $\theta_C$ and sin $\theta_C$ cos $\theta_I$;

summing means responsive to said first and second digital signals for developing an error signal related to the difference between said quantities sin $\theta_I$ cos $\theta_C$ and sin $\theta_C$ cos $\theta_I$; and means responsive to said error signal for modifying said angle $\theta_C$.

10. The apparatus of claim 9 wherein said first digital means comprises a digital sine-cosine function generator providing digital signals respectively representing the quantities sin $\theta_C$ and cos $\theta_C$.

11. The apparatus of claim 10 including means responsive to said first and second analog signals for developing first and second pulse rate signals respectively related to said sine and cosine functions of said angle $\theta_I$; and wherein said second digital means comprises digital multiplication means responsive to said first and second pulse rate signals and said digital signals representing the quantities sin $\theta_C$ and cos $\theta_C$ for developing said first and second digital signals.

References Cited

UNITED STATES PATENTS

| | | | |
|---|---|---|---|
| 2,980,900 | 4/1961 | Rabin | 340—347 |
| 2,987,717 | 6/1961 | Altonji | 340—347 |
| 3,217,318 | 11/1965 | Masel | 340—347 |
| 3,354,453 | 11/1967 | Hibbits | 340—347 |
| 3,358,280 | 12/1967 | Dougherty | 340—347 |

MAYNARD R. WILBUR, Primary Examiner

J. GLASSMAN, Assistant Examiner